J. C. JUTHE.
CHILD'S CAR.
APPLICATION FILED JULY 29, 1919.
1,348,118.
Patented July 27, 1920.
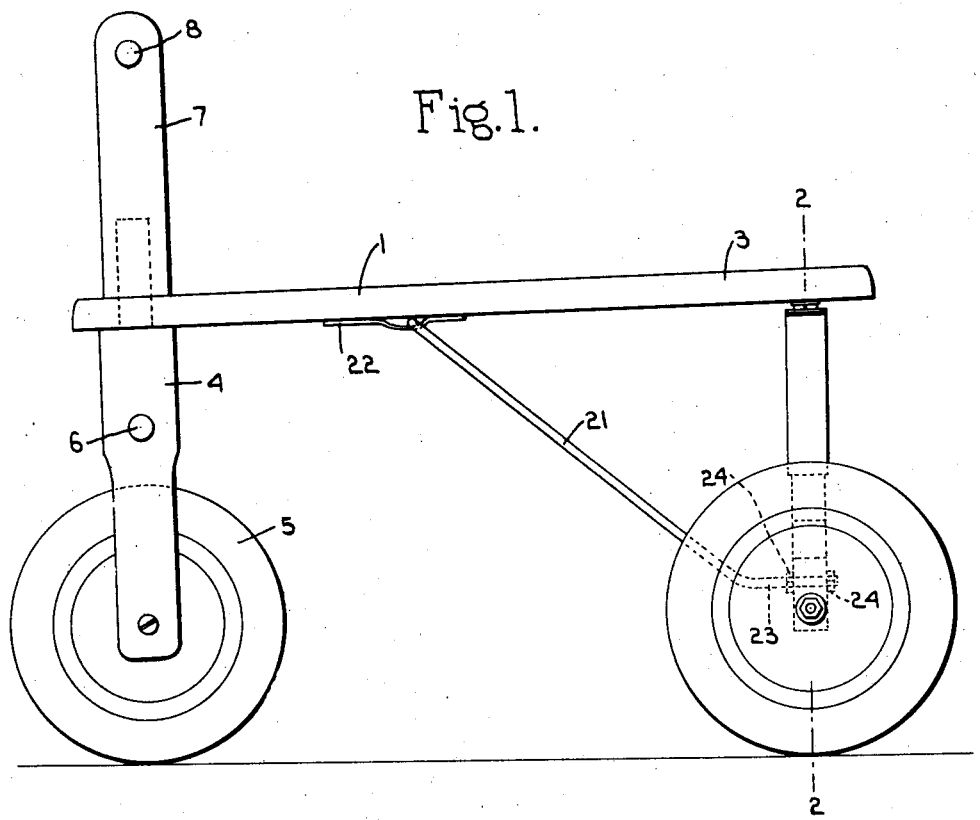
Fig. 1.
Fig. 2.
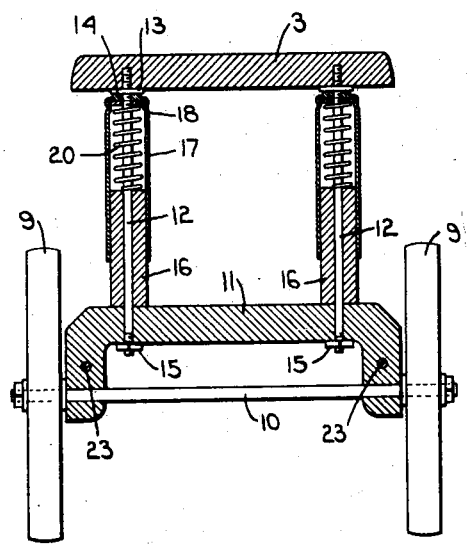
Inventor.
John C. Juthe
by Heard Smith & Tennant.
Attys.

UNITED STATES PATENT OFFICE.

JOHN C. JUTHE, OF ALLSTON, MASSACHUSETTS.

CHILD'S CAR.

1,348,118.   Specification of Letters Patent.   Patented July 27, 1920.

Application filed July 29, 1919. Serial No. 314,059.

*To all whom it may concern:*

Be it known that I, JOHN C. JUTHE, a citizen of the United States, residing at Allston, county of Suffolk, and State of Massachusetts, and whose post-office address is 142 Liverpool street, East Boston, Massachusetts, have invented an Improvement in Children's Cars, of which the following description, in connection with the accompanying drawing, is a specification, like characters on the drawing representing like parts.

This invention relates to a child's car of a character particularly designed for the use of smaller children and which is commonly propelled by the child sitting on the seat of the car and pushing on the ground with its feet.

The object of the present invention is to provide a car of this type having a vertically yielding shock absorbing connection between the platform or frame having the seat, and the bolster carrying the rear wheels. This not only adds to the comfort and pleasure of the child, but pleases its fancy.

The object of the invention is further to provide such a device in which one or more expansion springs are employed and in which the mechanism is so constructed as to inclose and conceal the springs.

These and other objects of the invention will appear more fully from the accompanying description and drawings and will be particularly pointed out in the claims.

In the drawings:

Figure 1 is a side elevation of a child's car embodying a preferred form of the invention.

Fig. 2 is a view chiefly in cross section taken on the line 2—2 of Fig. 1.

The car with which this invention is concerned is, as has already been pointed out, designed for use particularly by small children and is of that type in which the child when seated straddles the car and propels it by the action of its feet pushing against the ground or the surface over which it travels. A simple form of such a child's car is illustrated, but it is obvious that the structure and form of the car may be widely varied without affecting the principles of the present invention.

As illustrated, the car comprises a frame or platform 1 the rear portion of which is widened at 2 to form the seat 3. This frame having the seat is supported at the proper height above the ground by front and rear wheels so that the child sitting upon the seat 3 and straddling the forward end of the frame may easily reach the ground with its feet and propel the car by pushing on the ground.

The particular construction of the forward end of the car is in no way involved with the present invention. As illustrated a vertical post 4 having journaled therein a single wheel 5 and provided with laterally extending foot-rests 6 is journaled in the forward end of the frame 1. Above the frame a steering head 7 is connected to the post and provided with laterally projecting steering handles 8. Thus the child while propelling the car may readily steer it in the desired direction and if it desires to coast may do so by placing its feet upon the foot-rests 6.

The rear end of the car is supported preferably by a pair of wheels 9 mounted upon an axle 10 journaled in a bolster 11.

The shock absorbing feature with which this invention is particularly concerned may in its broader aspects take various forms, but a simple and effective form for embodying the principles of the invention is illustrated in the drawings.

Preferably the shock absorbing connections between the frame and the bolster is duplicated at each side which gives a strong and well balanced construction and appearance.

In the case of each shock absorbing device a vertical guide rod 12 connects the frame and bolster and has a sliding fit preferably at but one of its ends to permit the frame and bolster to move toward and from each other. This is effected by screwing the upper end of the rod 12 which is screw threaded for that purpose into a nut 13 secured to the frame and locking it in the position by a lock nut 14 and by passing the lower end of the rod through the bolster allowing it to slide freely therein and placing a nut 15 upon the lower end of the rod.

In each case a pair of telescoping members guided by the rod and abutting respectively the frame and the bolster inclose and conceal an expansion spring which yieldingly presses the frame and bolster apart.

A simple form of construction for the pair of telescoping members is provided by having one member, as for example the lower member, consist of a cylindrical block of wood 16 slipped over the rod 12 and resting on the bolster, and by having the other member, as for example the upper member, consist of a metal cylinder 17 sliding on the rod 12 and fitting over the cylinder 16. The metal cylinder 17 is shown as closed at its upper end except for the aperture to permit the passage of the rod 12 by a disk 18.

The expansion spring is shown as a helical spring 20 mounted on the rod 12 and positioned between the upper end of the wooden cylinder 16 and the under side of the disk 18. The spring is thus completely concealed and protected at all times.

In order to strengthen the construction of the car it is desirable to provide a bracing connection between the frame and bolster, otherwise all transverse strains will be taken by the rod 12. The invention therefore provides braces extending diagonally between the bolster and the frame end having a sliding connection preferably at one end so arranged that the brace may move sufficiently to co-act with the shock absorbing feature, but at the same time prevent the generally normal relation between the bolster and the frame from being materially disturbed.

In the form illustrated this brace is shown as a member 21 formed of a heavy wire or rod bent into the shape of a hair pin with the loop end having a sliding connection with the frame 1 by means of the plate 22 passed through the loop and secured to the frame while the free ends 23 are passed through the bolster and locked in place by nuts 24.

It will thus be seen that as the child sits upon the car the seat or rear end of the frame will rise and fall with respect to the bolster under the action of jars or the change in weight of the load and the brace will maintain the relation between the bolster and the frame. The entire device is simple and strong in construction and one which will in no way injure the child or its clothing.

Having thus described my invention what I claim as new and desire to secure by Letters Patent is—

1. A child's car comprising a frame having a seat at the rear and supported by front and rear wheels, a bolster in which the rear wheels are mounted, a vertical guide rod connecting the frame and bolster having a sliding fit to permit the frame and bolster to move toward and from each other, a pair of telescoping members guided by said rod and abutting respectively the frame and said bolster, and an extension spring inclosed by said members.

2. A child's car having the construction defined in claim 1 together with a brace extending diagonally between the bolster and frame and having a sliding connection at one end.

3. A child's car comprising a frame having a seat at the rear supported by front and rear wheels, a bolster in which the rear wheels are mounted, vertically yielding shock absorbing connections between the frame and bolster at both ends of the bolster, each of said connections comprising a vertical guide rod connecting the frame and bolster and having a sliding fit at one end to permit the frame and bolster to move toward and from each other, a pair of telescoping members guided by said rod and abutting respectively the frame and bolster, and an expansion spring inclosed by said members.

4. A child's car having the construction defined in claim 3 together with a diagonal brace of hair pin shape having its loop end slidingly connected to the frame and its free ends connected to the bolster near opposite ends thereof.

In testimony whereof I have signed my name to this specification.

JOHN C. JUTHE.